US012444859B2

(12) United States Patent
Kim et al.

(10) Patent No.: US 12,444,859 B2
(45) Date of Patent: Oct. 14, 2025

(54) ANTENNA AND ELECTRONIC DEVICE INCLUDING THE SAME

(71) Applicant: Samsung Electronics Co., Ltd., Suwon-si (KR)

(72) Inventors: Youngsub Kim, Suwon-si (KR); Sohyeon Jung, Suwon-si (KR); Kwanghyun Baek, Suwon-si (KR); Youngju Lee, Suwon-si (KR); Juneseok Lee, Suwon-si (KR); Dohyuk Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 18/145,550

(22) Filed: Dec. 22, 2022

(65) Prior Publication Data

US 2023/0129937 A1 Apr. 27, 2023

Related U.S. Application Data

(63) Continuation of application No. PCT/KR2022/007375, filed on May 24, 2022.

(30) Foreign Application Priority Data

May 24, 2021 (KR) ........................ 10-2021-0066541

(51) Int. Cl.
*H01Q 21/00* (2006.01)
*H01P 1/26* (2006.01)
(Continued)

(52) U.S. Cl.
CPC ........... *H01Q 21/0075* (2013.01); *H01P 1/26* (2013.01); *H01P 3/08* (2013.01); *H01Q 1/246* (2013.01); *H01Q 1/48* (2013.01)

(58) Field of Classification Search
CPC ...... H01Q 21/0075; H01Q 1/246; H01Q 1/48; H01Q 1/243; H01Q 1/38; H01Q 21/065;
(Continued)

(56) References Cited

U.S. PATENT DOCUMENTS 7,068,234 B2 * 6/2006 Sievenpiper ......... H01Q 15/002 343/750
7,215,007 B2 * 5/2007 McKinzie, III ....... H01P 1/2005 257/664
(Continued)

FOREIGN PATENT DOCUMENTS

CN 110380201 A 10/2019
CN 110707422 A 1/2020
(Continued)

OTHER PUBLICATIONS

International Search Report dated Sep. 20, 2022, issued in International Application No. PCT/KR2022/007375.
(Continued)

*Primary Examiner* — Dameon E Levi
*Assistant Examiner* — Jordan E. DeWitt
(74) *Attorney, Agent, or Firm* — Jefferson IP Law, LLP

(57) ABSTRACT

An electronic device is provided. The electronic device includes a plurality of antenna arrays, a plurality of first printed circuit board (PCB) sets corresponding to the plurality of the antenna arrays, and a second PCB including a power interface, the second PCB may include a feeding line for delivering signals to the antenna elements, a first layer formed away from a first surface of the feeding line, and a second layer formed away from a second surface of the feeding line, and the second layer may include a metamaterial for transforming impedance.

20 Claims, 14 Drawing Sheets

(51) Int. Cl.
*H01P 3/08* (2006.01)
*H01Q 1/24* (2006.01)
*H01Q 1/48* (2006.01)

(58) Field of Classification Search
CPC .... H01Q 1/46; H01Q 15/0086; H01Q 15/008; H01Q 21/0025; H01Q 21/061; H01P 1/26; H01P 3/08; H01P 1/2005; H01P 3/085; H01P 1/047
See application file for complete search history.

(56) References Cited

U.S. PATENT DOCUMENTS

| | | | | |
|---|---|---|---|---|
| 7,352,260 | B2 | 4/2008 | Kim et al. | |
| 7,482,893 | B2 | 1/2009 | Itoh et al. | |
| 8,004,369 | B2 | 8/2011 | Kwon et al. | |
| 8,810,455 | B2 | 8/2014 | Achour et al. | |
| 9,899,982 | B2 | 2/2018 | Tsai et al. | |
| 9,923,261 | B2 | 3/2018 | Jin et al. | |
| 10,594,019 | B2 | 3/2020 | Baks et al. | |
| 11,646,496 | B2 * | 5/2023 | Kim | H01Q 9/0457 343/702 |
| 2008/0129626 | A1 * | 6/2008 | Wu | H01Q 15/0026 343/872 |
| 2010/0052821 | A1 * | 3/2010 | Kushta | H01P 1/203 333/204 |
| 2010/0060544 | A1 * | 3/2010 | Penev | H01Q 9/0442 343/876 |
| 2010/0265159 | A1 * | 10/2010 | Ando | H05K 1/0236 343/913 |
| 2011/0170267 | A1 * | 7/2011 | Ando | H01Q 15/14 174/126.1 |
| 2012/0092219 | A1 | 4/2012 | Kim | |
| 2012/0119932 | A1 * | 5/2012 | MacDonald | H01Q 1/425 342/1 |
| 2012/0249374 | A1 | 10/2012 | Wang | |
| 2013/0249765 | A1 | 9/2013 | Su | |
| 2015/0270592 | A1 * | 9/2015 | Tanaka | H03H 1/0007 333/176 |
| 2016/0226155 | A1 * | 8/2016 | Warnick | H01Q 21/0075 |
| 2017/0229784 | A1 | 8/2017 | Kitamura et al. | |
| 2018/0062262 | A1 * | 3/2018 | Kasemodel | H01Q 7/08 |
| 2018/0159239 | A1 | 6/2018 | Wyler et al. | |
| 2018/0269168 | A1 | 9/2018 | Mizuno | |
| 2018/0269577 | A1 * | 9/2018 | Kosaka | H01Q 5/48 |
| 2020/0168974 | A1 | 5/2020 | Vosoogh | |
| 2020/0168996 | A1 | 5/2020 | Nasimuddin et al. | |
| 2020/0315001 | A1 * | 10/2020 | Khan | H01Q 1/38 |
| 2020/0329556 | A1 * | 10/2020 | Baek | H05K 1/0251 |
| 2020/0395660 | A1 | 12/2020 | Kuroda et al. | |
| 2022/0102835 | A1 * | 3/2022 | Makurin | H01Q 1/52 |
| 2022/0123470 | A1 * | 4/2022 | Kim | H01Q 1/523 |
| 2023/0187833 | A1 * | 6/2023 | Baek | H01Q 21/24 343/702 |
| 2023/0282984 | A1 * | 9/2023 | Cheah | H01Q 1/523 343/702 |
| 2024/0204418 | A1 * | 6/2024 | Shepeleva | H01Q 15/0086 |

FOREIGN PATENT DOCUMENTS

| | | | | |
|---|---|---|---|---|
| DE | 102020108280 | A1 * | 10/2020 | H01L 23/66 |
| JP | 2018-093491 | A | 6/2018 | |
| KR | 10-2005-0085238 | A | 8/2005 | |
| KR | 10-0579137 | B1 | 5/2006 | |
| KR | 10-2006-0059868 | A | 6/2006 | |
| KR | 10-2009-0014279 | A | 2/2009 | |
| KR | 10-1176800 | B1 | 8/2012 | |
| KR | 10-2019-0083607 | A | 7/2019 | |
| KR | 10-2021-0011484 | A | 2/2021 | |
| SE | 543202 | C2 | 10/2020 | |
| WO | WO-2006039699 | A2 * | 4/2006 | H01Q 1/362 |
| WO | WO-2010125784 | A1 * | 11/2010 | H01P 1/2005 |
| WO | WO-2021078654 | A1 * | 4/2021 | H01Q 1/523 |
| WO | WO-2021150384 | A1 * | 7/2021 | H01Q 1/3233 |
| WO | WO-2022250428 | A1 * | 12/2022 | H01P 1/047 |

OTHER PUBLICATIONS

Ma et al., Millimeter-Wave Circularly Polarized Array Antenna Using Substrate-Integrated Gap Waveguide Sequentially Rotating Phase Feed; IEEE Antennas And Wireless Propagation Letters, vol. 18, No. 6, Jun. 2019.

Extended European Search Report dated Jul. 22, 2024, issued in European Application No. 22811621.6-1201.

Korean Office Action dated Jun. 26, 2025, issued in Korean Patent Application No. 10-2021-0066541.

* cited by examiner

ANTENNA AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/007375, filed on May 24, 2022, which is based on and claims the benefit of a Korean patent application number 10-2021-0066541, filed on May 24, 2021, in the Korean Intellectual Property Office, the disclosure of which is incorporated by reference herein in its entirety.

TECHNICAL FIELD

The disclosure relates to a wireless communication system. More particularly, the disclosure relates to an antenna and an electronic device including the same in the wireless communication system.

BACKGROUND ART

A beamforming technology is being used, as one of the techniques for mitigating the propagation path loss and increasing the propagation distance. The beamforming may, in general, concentrate electromagnetic wave coverage using a plurality of antennas, or increase directivity of reception sensitivity in a specific direction. To operate the beamforming technology, a communication node may include a plurality of antennas.

Since the $5^{th}$ generation (5G) mobile communication system communicates using the extremely high frequency signal, an efficient antenna system is required to mitigate the propagation path loss and increase the propagation distance. An antenna including a phase shifter may include an antenna element, a power amplifier and a phase shifter.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above mentioned problems and/or disadvantages and to provide at least the advantages described below. Accordingly, an aspect of the disclosure is to provide an antenna module for reducing a feedline length and thus reducing a loss by mounting the feedline within a radio unit (RU) board and a metamaterial in a wireless communication system and an electronic device including the same.

Another aspect of the disclosure is to provide an antenna module for reducing a feedline length by mounting a metamaterial at a ground position below a feeding line, and thus reducing a loss in a wireless communication system and an electronic device including the same.

Another aspect of the disclosure is to provide an antenna module for reducing a loss through impedance matching, by mounting a metamaterial in a wireless communication system and an electronic device including the same.

Additional aspects will be set forth in part in the description which follows and, in part, will be apparent from the description, or may be learned by practice of the presented embodiments.

Technical Solution

In accordance with an aspect of the disclosure, a radio unit (RU) module is provided. The RU module includes a plurality of antenna arrays, a first printed circuit board (PCB) corresponding to the plurality of the antenna arrays, and a second PCB including a power interface, the second PCB may include a feeding line for delivering signals to the antenna elements, a first layer formed away from a first surface of the feeding line, and a second layer formed away from a second surface of the feeding line, and the second layer may include a metamaterial for transforming impedance.

In accordance with another aspect of the disclosure, an electronic device is provided. The electronic device includes a plurality of antenna arrays, a plurality of first PCB sets corresponding to the plurality of the antenna arrays, and a second PCB including a power interface, the second PCB may include a feeding line for delivering signals to the antenna elements, a first layer formed away from a first surface of the feeding line, and a second layer formed away from a second surface of the feeding line, and the second layer may include a metamaterial for transforming impedance.

Advantageous Effects

An apparatus and a method according to various embodiments of the disclosure, may reduce a length of a feedline by mounting a metamaterial at a ground below the feedline, and thus reduce a path loss and provide high antenna performance in a wireless communication system.

Other aspects, advantages, and salient features of the disclosure will become apparent to those skilled in the art from the following detailed descriptions, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Various embodiments of the disclosure to be described explain a hardware approach by way of example. However, since the various embodiments of the disclosure include a technology using both hardware and software, various embodiments of the disclosure do not exclude a software based approach.

Terms indicating parts of an electronic device (e.g., a board structure, a substrate, a printed circuit board (PCB), a flexible PCB (FPCB), a module, an antenna, a radiator, an antenna element, a circuit, a processor, a chip, a component, a device), terms indicating shapes of a part (e.g., a structure body, a structure, a support portion, a contact portion, a protrusion portion, an opening portion), terms indicating connection units between structures (e.g., a connection line, a feeding line, a connection portion, a contact portion, a feeding point, a feeding unit, a support portion, a contact structure, a conductive member, an assembly), and terms indicating circuits (e.g., a PCB, an FPCB, a signal line, a feeding line, a data line, a radio frequency (RF) signal line, an antenna line, an RF path, an RF module, an RF circuit) used in the following explanations may be used by way of example for convenience of description. Accordingly, the disclosure is not limited to terms to be described, and other terms having equivalent technical meanings may be used. In addition, terms, such as ‘ . . . unit’, ‘ . . . er’, ‘ . . . structure’, and ‘ . . . body’ used herein may indicate at least one shape structure or a unit for processing a function.

Figure 1:
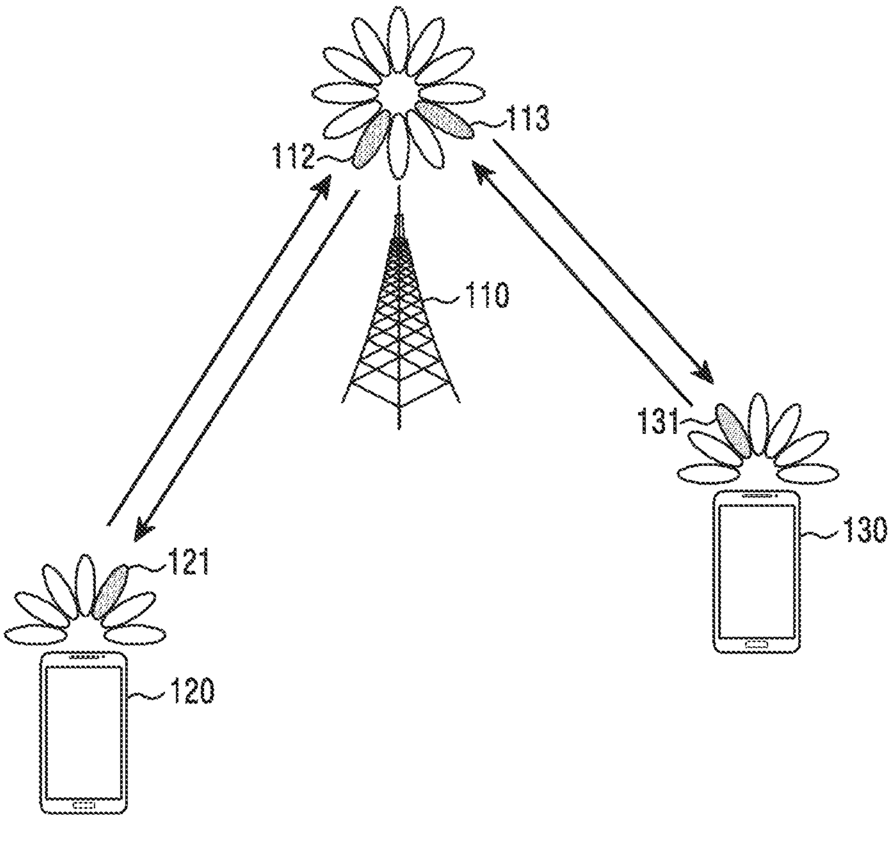
FIG. 1 illustrates a wireless communication environment according to an embodiment of the disclosure.

FIG. 1 illustrates a wireless communication environment according to an embodiment of the disclosure.

Referring to FIG. 1, it illustrates a base station 110, a terminal 120, and a terminal 130, as some of nodes using radio channels in a wireless communication system. Although FIG. 1 illustrates only one base station, other base stations which are the same as or similar to the base station 110 may further be included.

The base station 110 is a network infrastructure which provides radio access to the terminals 120 and 130. The base station 110 has coverage defined as a specific geographic region based on a signal transmission distance. The base station 110 may be referred to as, beside the base station, an ‘access point (AP),’ an ‘eNodeB (eNB),’ a ‘$5^{th}$ generation node (5G node),’ a ‘wireless point,’ a ‘transmission/reception point (TRP)’ or other term having technically identical meaning.

Each of the terminal 120 and the terminal 130 is a device used by a user, and communicates with the base station 110 over the radio channel. In some cases, at least one of the terminal 120 or the terminal 130 may be operated without user’s involvement. For example, at least one of the terminal 120 or the terminal 130 may be a device which performs machine type communication (MTC), and may not be carried by the user. The terminal 120 and the terminal 130 each may be referred to as, beside the terminal, a ‘user equipment (UE),’ a ‘mobile station,’ a ‘subscriber station,’ a ‘customer premises equipment (CPE),’ a ‘remote terminal,’ a ‘wireless terminal,’ an ‘electronic device,’ or a ‘user device’ or other term having technically identical meaning.

The base station 110, the terminal 120, and the terminal 130 may transmit and receive radio signals in a millimeter wave (mmWave) band (e.g., 28 GHz, 30 GHz, 38 GHz, and 60 GHz). In this case, to improve a channel gain, the base station 110, the terminal 120, and the terminal 130 may perform beamforming. Herein, the beamforming may include transmit beamforming and receive beamforming. For example, the base station 110, the terminal 120, and the terminal 130 may give directivity to a transmit signal or a receive signal. For doing so, the base station 110 and the terminals 120 and 130 may select serving beams 112, 113, 121, and 131 through a beam search or beam management procedure. After the serving beams 112, 113, 121, and 131 are selected, communication may be performed through resources which are quasi co-located (QCL) with resources transmitting the serving beams 112, 113, 121, and 131.

The base station 110 or the terminals 120 and 130 may include an antenna array. Each antenna included in the antenna array may be referred to as an array element, or an antenna element. Hereafter, the antenna array is illustrated as a two-dimensional planar array in the disclosure, which is merely an embodiment of the disclosure, and does not limit other embodiments of the disclosure. The antenna array may be configured in various forms such a linear array or a multi-layer array. The antenna array may be referred to as a massive antenna array. In addition, the antenna array may include a plurality of sub arrays including a plurality of antenna elements.

The terminal 120 and the terminal 130 shown in FIG. 1 may support vehicle communication. In the vehicle communication, long term evolution (LTE) system has completed standardization of vehicle to everything (V2X) technology (e.g., vehicle to vehicle (V2V), vehicle to infrastructure (V2I), or the like) based on a device-to-device (D2D) communication structure in 3rd generation partnership project (3GPP) release 14 and release 15, and efforts are underway to develop the V2X technology based on a current 5G new radio (NR). NR V2X supports unicast communication, groupcast (or multicast) communication, and broadcast communication between a terminal and a terminal.

Figure 2A:
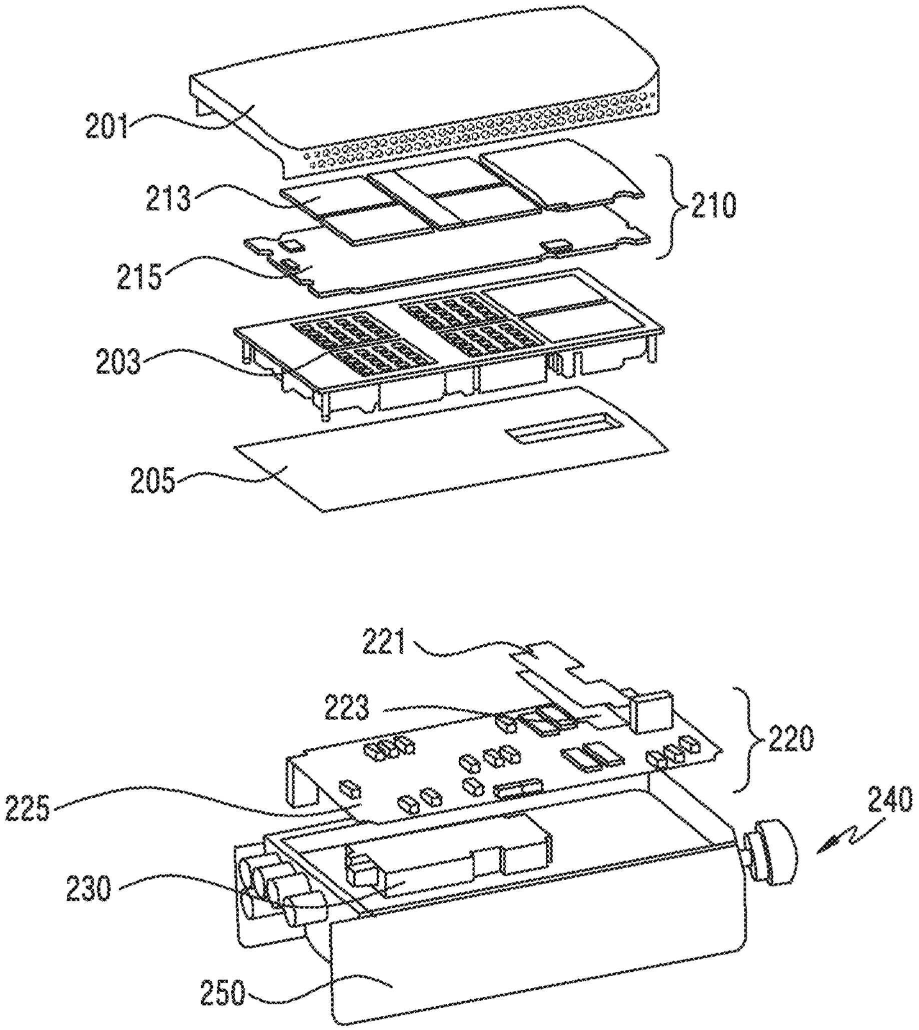
FIGS. 2A and 2B illustrate components of an electronic device according to various embodiments of the disclosure.
Figure 2B:
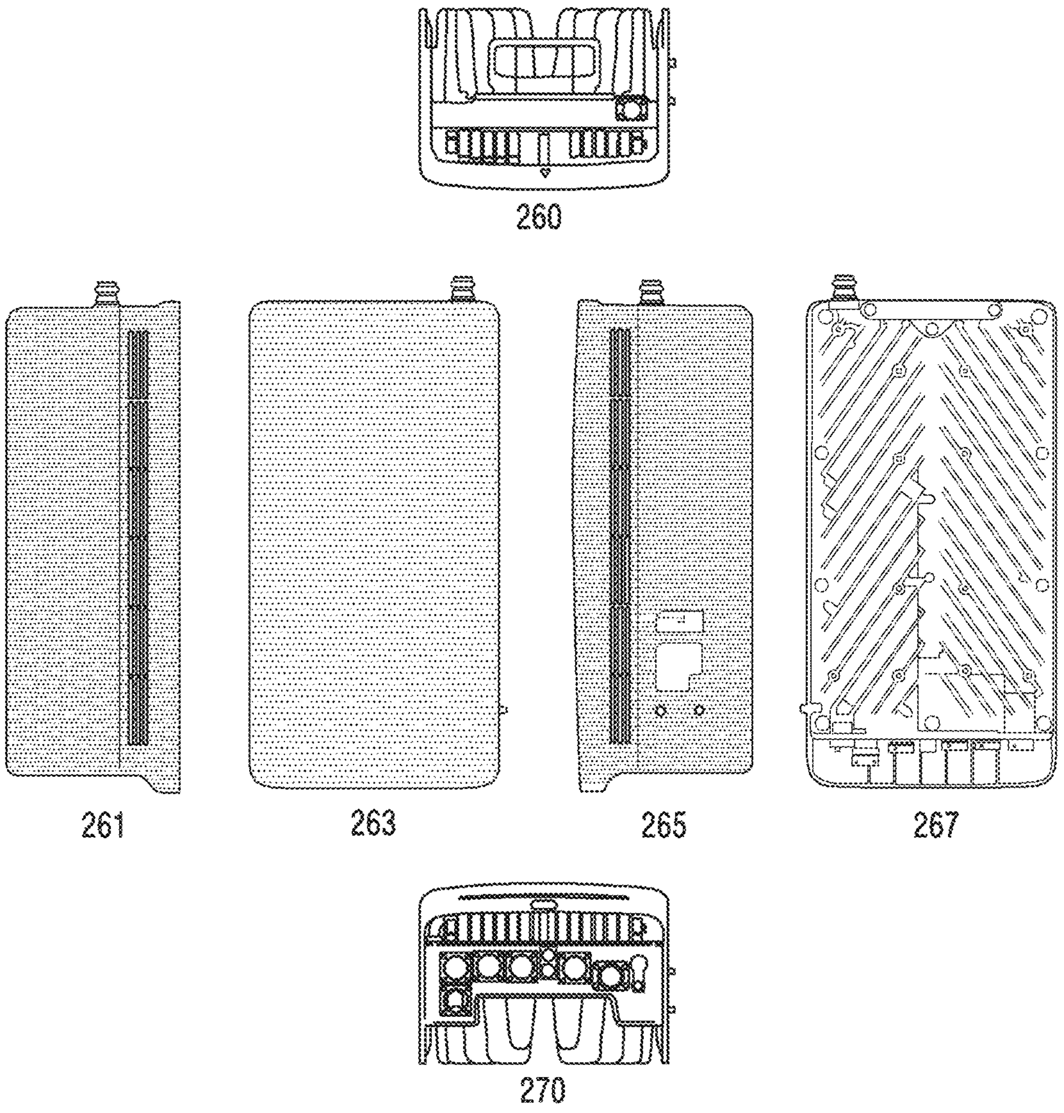

FIGS. 2A and 2B illustrate components of an electronic device according to various embodiments of the disclosure. FIG. 2A illustrates internal components of the electronic device according to an embodiment of the disclosure, and FIG. 2B illustrates a top surface, a bottom surface, and a side surface of the electronic device according to an embodiment of the disclosure.

Referring to FIG. 2A, the electronic device may include a cover 201, a radio unit (RU) housing 203, a digital unit (DU) cover 205, and an RU 210. The RU 210 may include an antenna module and RF components 213 for the antenna module. The RU 210 may include the antenna module having an air based feed structure according to an embodiment of the disclosure to be described. According to an embodiment of the disclosure, the antenna module may include a ball grid array (BGA) module antenna. The RU 210 may include an RU board 215 on which the RF components 213 are mounted.

The electronic device may include a DU 220. The DU 220 may include an interface board 221, a modem board 223, and a central processing unit (CPU) board 225. The electronic device may include a power module 230, a global positioning system (GPS) 240, and a DU housing 250.

Referring to FIG. 2B, a drawing 260 illustrates a view taken above the electronic device. A drawing 261, a drawing 263, a drawing 265, and a drawing 267 show views taken from left, front, right, and back of the electronic device respectively. A drawing 270 illustrates a view taken from below the electronic device.

Figure 3A:
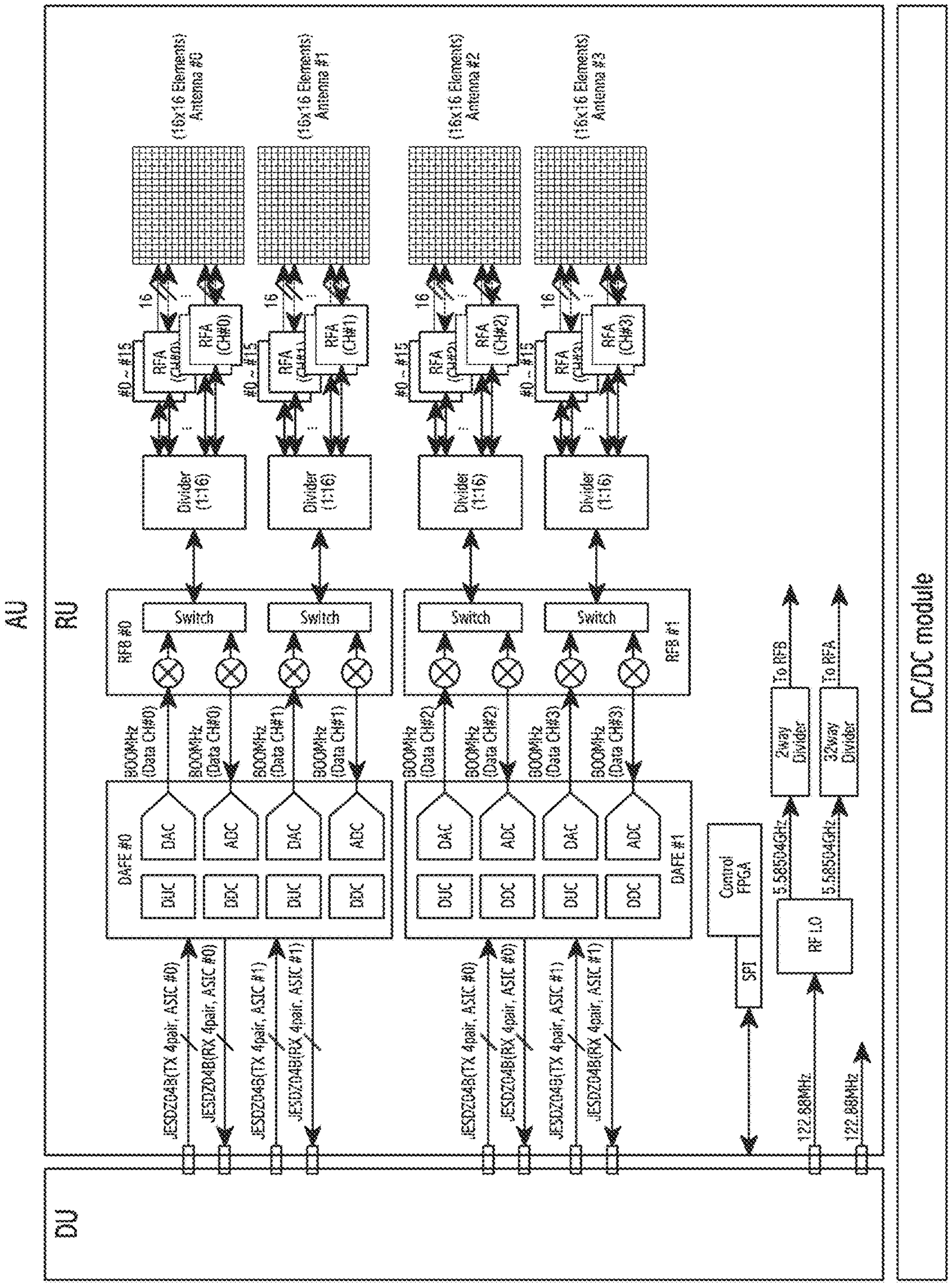
FIGS. 3A and 3B illustrate a functional configuration of an electronic device according to various embodiments of the disclosure.
Figure 3B:
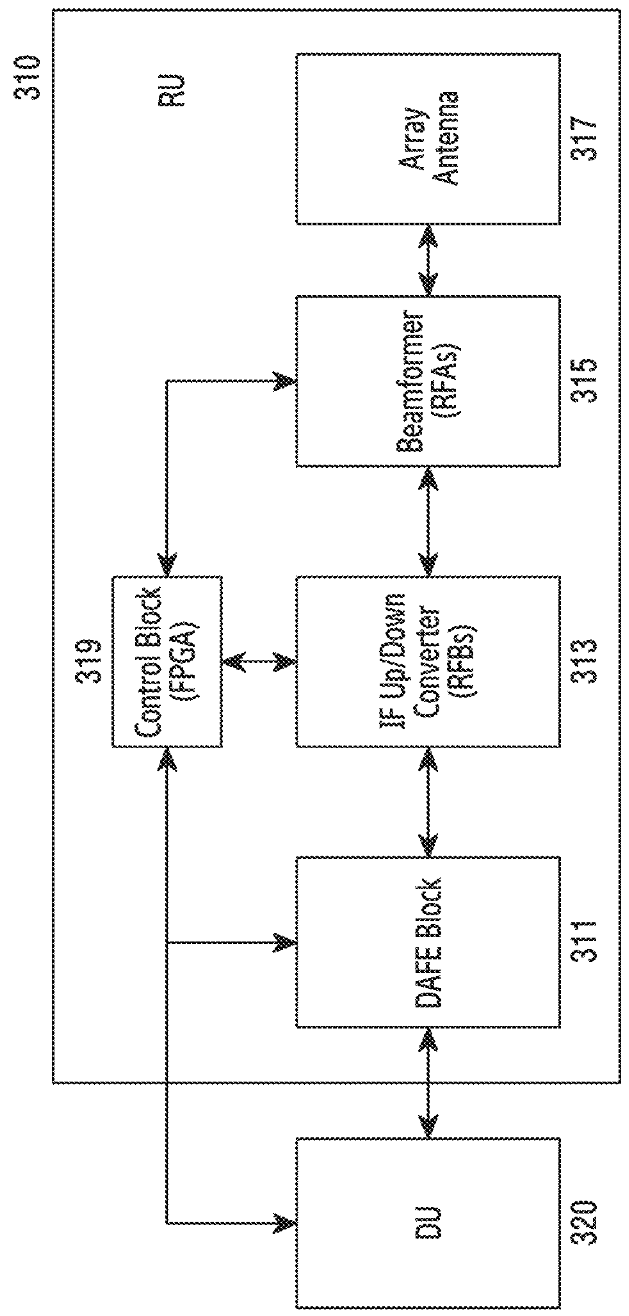

FIGS. 3A and 3B illustrate a functional configuration of an electronic device according to various embodiments of the disclosure.

Referring to FIGS. 3A and 3B, the electronic device may include an access unit. The access unit may include an RU 310, a DU 320, and a direct current (DC)/DC module. The RU 310 according to an embodiment of the disclosure may indicate an assembly on which antennas and RF components are mounted. The DU 320 according to an embodiment of the disclosure may be configured to process a digital radio signal, and may be configured to encode a digital radio signal to be transmitted to the RU 310, or to decode a digital radio signal received from the RU 310. The DU 320 may be configured to communicate with an upper node (e.g., a centralized unit (CU)) or a core network (e.g., a 5G core (5GC) or an evolved packet core (EPC)), by processing packet data.

Referring to FIG. 3A, the RU 310 may include a plurality of antenna elements. The RU 310 may include one or more array antennas. According to an embodiment of the disclosure, the array antenna may include a planar antenna array. The array antenna may correspond to one data stream. The array antenna may include a plurality of antenna elements corresponding to one transmit path (or one receive path). For example, the array antenna may include 256 antenna elements configured as a 16 antenna element×16 antenna element array.

The RU 310 may include RF chains for processing signals of the array antennas respectively. The RF chains may be referred to as an 'RFA'. The RFA may include RF components (e.g., a phase shifter, a power amplifier) and a mixer for the beamforming. The mixer of the RFA may be configured to down-convert an RF signal of an RF frequency into an intermediate frequency or to up-convert an intermediate frequency signal into an RF frequency signal. According to an embodiment of the disclosure, RF chains of one set may correspond to one array antenna. For example, the RU 310 may include four RF chain sets for four array antennas. The plurality of the RF chains may be connected with the transmit path or the receive path through a divider (e.g., 1:16). Although not depicted in FIG. 3A, the RF chains may be implemented with an RF integrated circuit (IC), according to an embodiment. The RFIC may process and generate RF signals provided to the plurality of the antenna elements.

The RU 310 may include a digital analog front end (DAFE) and an 'RFB'. The DAFE may be configured to convert a digital signal and an analog signal. For example, the RU 310 may include two DAFEs (DAFE #0, DAFE #1). In the transmit path, the DAFE may be configured to up-convert a digital signal (i.e., DUC), and to convert the up-converted signal into an analog signal (i.e., DAC). In the receive path, the DAFE may be configured to convert an analog signal into a digital signal (i.e., ADC), and to down-convert a digital signal (i.e., DDC). The RFB may include a mixer and a switch corresponding to the transmit path and the receive path. The mixer of the RFB may be configure to up-convert a baseband frequency into the intermediate frequency or to down-convert an intermediate frequency signal into a baseband frequency signal. The switch may be configured to select one of the transmit path and the receive path. For example, the RU 310 may include two RFBs (RFB #0, RFB #1).

The RU 310 is a controller, and may include a field programmable gate array (FPGA). The FPGA indicates a semiconductor element including a designable logic element and a programmable internal circuit. It may communicate with the DU 320 through serial peripheral interface (SPI) communication.

The RU 310 may include an RF local oscillator (LO). The RF LO may be configured to provide a reference frequency for the up-conversion or the down-conversion. According to an embodiment of the disclosure, the RF LO may be configured to provide a frequency for the up-conversion or the down-conversion of the RFB. For example, the RF LO may provide the reference frequency to the RFB #0 and the RFB #1 via a 2-way divider.

According to an embodiment of the disclosure, the RF LO may be configured to provide a frequency for the up-conversion or the down-conversion of the RFA. For example, the RF LO may provide the reference frequency to each RFA (to eight in each RF chain, per polarization group) via a 32-way divider.

Referring to FIG. 3B, the RU 310 may include a DAFE block 311, an IF up/down converter 313, a beamformer 315, an array antenna 317, and a control block 319. The DAFE block 311 may convert the digital signal into the analog signal or convert the analog signal into the digital signal. The IF up/down converter 313 may correspond to the RFB. The IF up/down converter 313 may convert the baseband frequency signal into the IF frequency signal, or convert the IF frequency signal into the baseband frequency signal based on the reference frequency provided from the RF LO. The beamformer 315 may correspond to the RFA. The beamformer 315 may convert the RF frequency signal into the IF frequency signal, or convert the IF frequency signal into the RF frequency signal based on the reference frequency provided from the RF LO. The array antenna 317 may include a plurality of antenna elements. Each antenna element of the array antenna 317 may be configured to radiate the signal processed through the RFA. The array antenna 317 may be configured to perform the beamforming according to a phase applied by the RFA. The control block 319 may control each block of the RU 310 to process a command from the DU 320 and the aforementioned signal.

While the base station is illustrated as the example of the electronic device in FIGS. 2A, 2B, 3A, and 3B, the various embodiments of the disclosure are not limited to the base station. The various embodiments of the disclosure may be applied to an electronic device for radiating a radio signal as well as the base station including the DU and the RU.

As technology advances, it is required to enhance transmission output, to achieve equivalent reception performance, and to support a dual band (e.g., 28 GHz band and 39 GHz band). To address such requirements and to reduce an RFIC package unit cost, a TR/RX switch (e.g., a single pole double throw (SPDT) switch) may be used. Adding a switch may cause insertion loss increase. For example, the Tx performance is degraded by 4 dB and the Rx performance is degraded by 3.6 dB based on the same antenna array. A compensation solution of about 1 dB loss is required, as the insertion loss in each band (e.g., 28 GHz band and 39 GHz band). In addition, an additional compensation solution is required due to the increased number of the elements and the spacing increase between the elements. To satisfy the above specifications, various embodiments of the disclosure suggest an antenna module for improving a feeding loss of an antenna and an electronic device including the same. The various embodiments of the disclosure suggest the antenna module having a deployment structure for achieving a low loss, together with cost reduction, and the electronic device including the same.

The various embodiments of the disclosure suggest an antenna structure for providing high transmission performance, by supporting the dual band and concurrently reducing the feeding loss in each band and an electronic device including the same. In addition, the various embodiments of the disclosure suggest an antenna structure for increasing mass production reliability in manufacturing, through deployment of a grid array robust to a bending characteristic and an electronic device including the same.

Figure 4A:
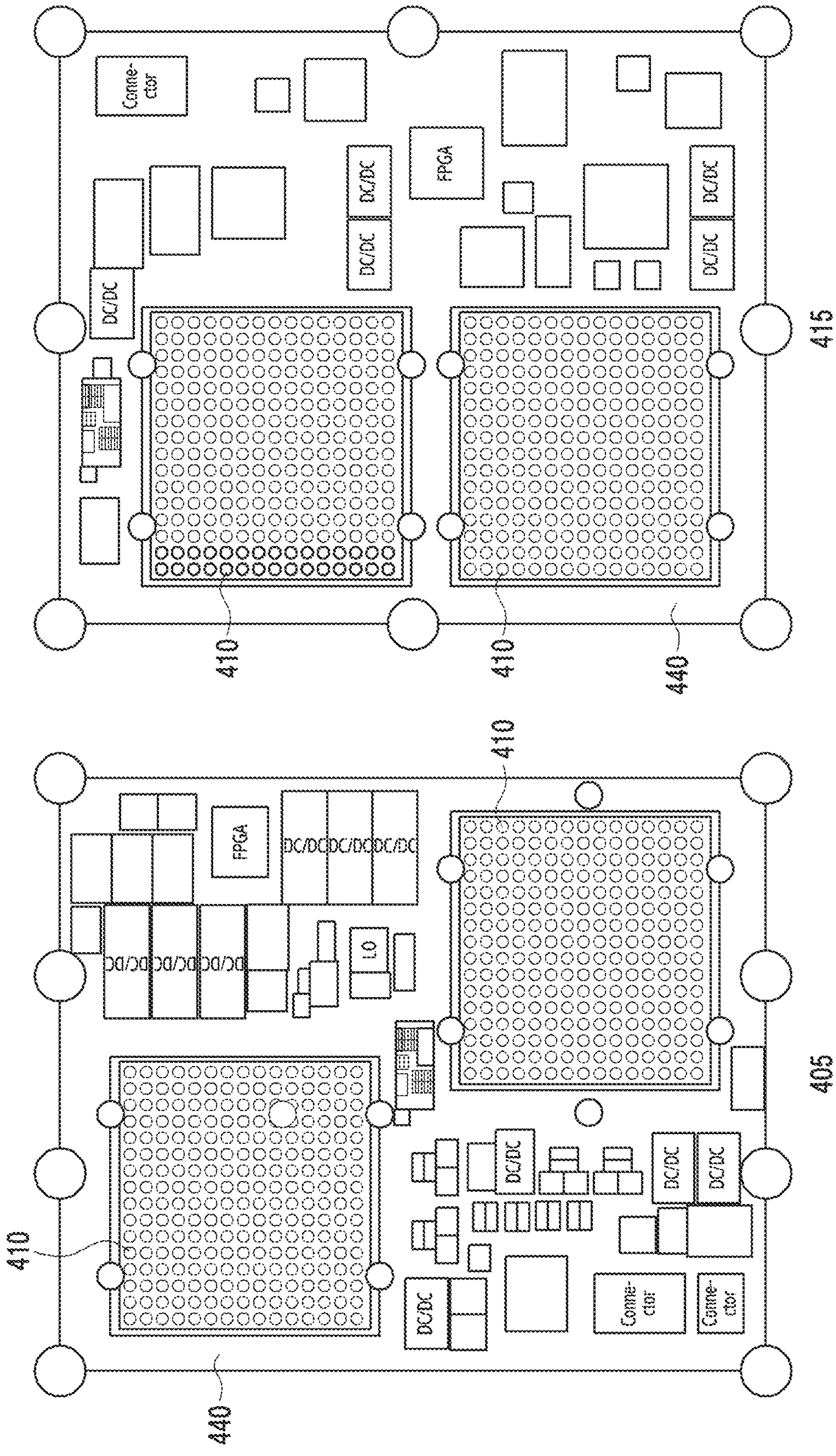
FIG. 4A illustrates a radio unit (RU) board of an electronic device according to an embodiment of the disclosure.

FIG. 4A illustrates an RU board of an electronic device according to an embodiment of the disclosure.

Referring to FIG. 4A, the electronic device indicates a structure in which a PCB (hereafter, a first PCB) for mounting an antenna, and a PCB (hereafter, a second PCB) for mounting array antennas and signal processing parts (e.g., a connector, a DC/DC converter, a DFE) are separately disposed. The first PCB may be referred to as an antenna board, an antenna substrate, a radiation substrate, a radiation board, or an RF board. The second PCB may be referred to as an RU board, a main board, a power board, a mother board, a package board, or a filter board.

Referring to FIG. 4A, the RU board may include parts for delivering a signal to a radiator (e.g., an antenna). According to an embodiment of the disclosure, one or more antenna PCBs 410 (i.e., first PCBs) may be mounted on the RU board. For example, one or more array antennas may be mounted on the RU board. For example, two antenna antennas may be mounted on the RU board. According to an embodiment of the disclosure, the array antennas may be disposed at symmetrical positions on the RU board 405. According to another embodiment of the disclosure, the array antennas may be disposed on one side (e.g., a left side) of the RU board, and RF components to be described may be disposed on the other side (e.g., a left side) 415. Two array antennas are illustrated in FIG. 4A, but various embodiments of the disclosure are not limited thereto. Two array antennas for each band to support the dual band may be disposed, and the array antennas mounted on the RU board may be configured to support 2-transmit 2-receive (2T2R).

The RU board may include parts for providing an RF signal to the antenna. According to an embodiment of the disclosure, the RU board may include one or more DC/DC converters. The DC/DC converter may be used to convert a first DC voltage to a second DC voltage. According to an embodiment of the disclosure, the RU board may include one or more LOs. The LO may be used to provide the reference frequency for the up-conversion or the down-conversion in the RF system. According to an embodiment of the disclosure, the RU board may include one or more connectors. The connector may be used to deliver an electrical signal. According to an embodiment of the disclosure, the RU board may include one or more dividers. The divider may be used to divide and forward an input signal to multiple paths. According to an embodiment of the disclosure, the RU board may include one or more low-dropout regulators (LDOs). The LDO may be used to reject external noise, and to supply power. According to an embodiment of the disclosure, the RU board may include one or more voltage regulator modules (VRMs). The VRM may indicate a module for guaranteeing appropriate voltage maintained. According to an embodiment of the disclosure, the RU board may include one or more digital front ends (DFEs). According to an embodiment of the disclosure, the RU board may include one or more radio (FPGAs). According to an embodiment of the disclosure, the RU board may include one or more IF processors. Meanwhile, some configuration of the parts shown in FIG. 4A may be omitted or more parts may be mounted, as the configuration shown in FIG. 4A. In addition, although not mentioned in FIG. 4A, the RU board may further include an RF filter for filtering a signal.

Figure 4B:
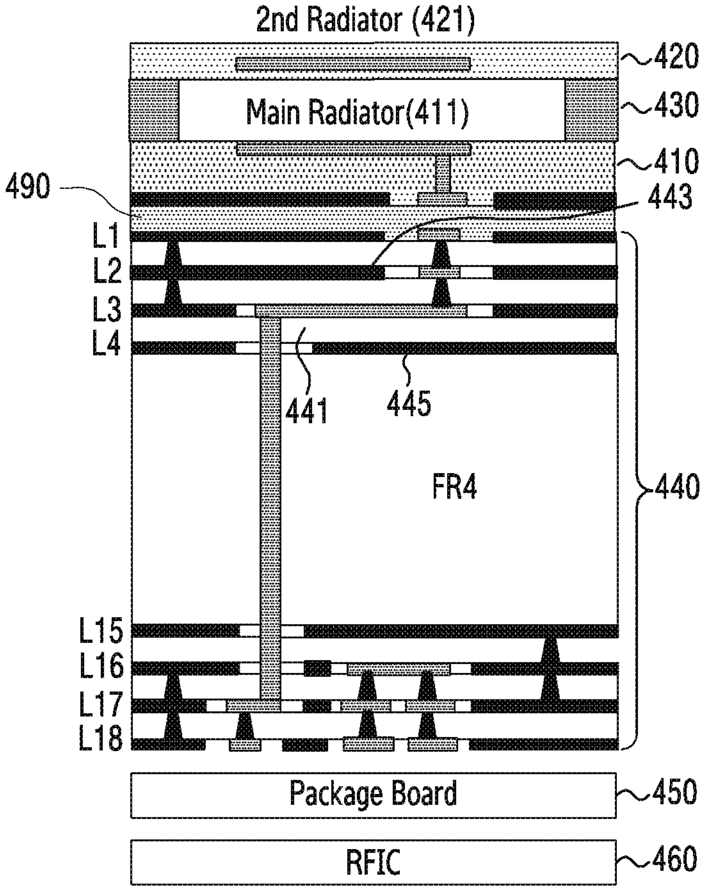
FIG. 4B illustrates an electronic device including an antenna structure according to an embodiment of the disclosure.

FIG. 4B illustrates an electronic device including an antenna structure according to an embodiment of the disclosure.

Referring to FIG. 4B, an RU board 440 of FIG. 4B may include a structure corresponding to the RU 310 of FIG. 3B. In other words, the RU board 440 of FIG. 4B may include devices and configurations included by the RU 310 of FIG. 3B, may not include some of them, or may further include other devices. FIG. 4B illustrates an electronic device 400 including one first radiator 411 and a second radiator 421, but the disclosure is not limited thereto.

Referring to FIG. 4B, the electronic device 400 may include a first PCB 410, an antenna portion 420, a frame structure 430, the RU board 440, a package board 450 and an RFIC 460. Herein, the first PCB 410 and the antenna portion 420 may indicate the antenna PCB of FIG. 3B as mentioned above.

According to an embodiment of the disclosure, the first PCB 410 may be disposed between the RU board 440 and the frame structure 430. The first PCB 410, which is disposed between the RU board 440 and the frame structure 430, may receive a signal from the RFIC 460 through the RU board 440. Herein, the signal transfer may indicate the feeding. The first radiator 411 may receive the signal fed from the RU board 440. Yet, the disclosure is not limited thereto. The first radiator 411 may be spaced by the frame structure 430 from the second radiator 421, and forward the fed signal to the first metal patch 421 separately disposed. In addition, the first radiator 411 may radiate the signal received from the RU board 440 to another electronic device.

According to an embodiment of the disclosure, the antenna portion 420 may be disposed above the frame structure 430. For example, the antenna portion 420 may be spaced by the frame structure 430 from the first PCB 410. An air layer may be formed by the frame structure 430 between the antenna portion 420 and the first PCB 410. According to an embodiment of the disclosure, the antenna portion 420 may be an in-case FPCB antenna. The antenna portion 420 may include the second radiator 421. The second radiator 421 may radiate the fed signal. In other words, the second radiator 421 may receive from the first radiator 411 and radiate the fed signal. Thus, the electronic device 400 may more efficiently transmit and receive signals through the two stacked radiators (e.g., the first radiator, the second radiator) than the one of the related art. For example, the electronic device 400 may transmit and receive signals having a wider bandwidth, through the separated radiators.

According to an embodiment of the disclosure, the frame structure 430 may be disposed between the first PCB 410 and the antenna portion 420. The frame structure 430 is disposed between the first PCB 410 and the antenna portion 420, thus forming an air layer. In addition, the frame structure 430 may be disposed not to interrupt the radiations of the first radiator 411 and the second radiator 421. For example, the frame structure 430 may be disposed not to overlap with the first radiator 411 and the second radiator 421. In addition, the frame structure 430 may be formed with a conductive material or a nonconductive material. For example, the frame structure 430 may be formed with a metal which is a conductive material. As another example, the frame structure 430 may be formed with a nonconductive material, such as a plastic by injection.

According to an embodiment of the disclosure, the RU board 440 may be disposed between the first PCB 410 and the package board 450. Herein the RU board 440 may be connected with the first PCB 410 with a coupler or a connector (490), or may be connected with the package board 450 with a grid array (e.g., a BGA, a land grid array (LGA)). In addition, the RU board 440 may include a power interface, and may be referred to as a second PCB 440. The second PCB 440 may include a feeding line 441. A first ground 443 may be disposed above the feeding line 441, and a second ground 445 may be disposed below the feeding line 441. The feeding line 441 included in the second PCB 440 may indicate a transmission line for forwarding the RF signal transferred from the RFIC 460 through the package board 450 to the first PCB 410.

According to an embodiment of the disclosure, the package board 450 may be disposed between the second PCB 440 and the RFIC 460. In addition, the package board 450 may be connected with the second PCB 440 by a grid array. For example, the grid array may be the BGA or the LGA. The package board 450 may be connected with the RFIC 460 through soldering. The package board 450 may forward the processed RF signal from the RFIC 460 to the second PCB 440.

According to an embodiment of the disclosure, the RFIC 460 may include a plurality of RF components for processing the RF signal. For example, the RFIC 460 may include a power amplifier, a mixer, an oscillator, a DAC, an ADC, and the like. According to an embodiment of the disclosure, the RFIC 460 may process the RF signal to transmit or receive a target signal in the electronic device 400, and the RF signal processed in the RFIC 460 may be transmitted or received through the package board 450, the second PCB 440, the first PCB 410, the antenna portion 420 and the plurality of the second radiators 421.

According to an embodiment of the disclosure, the feeding line 441 included in the second PCB 440 may have relatively low impedance due to the first ground 443 and the second ground 445, and the length of the feeding line 441 may excessively increase, for impedance matching. In this case, loss may occur due to the excessive length increase of the feeding line 441.

In the disclosure, a metamaterial may indicate a material artificially disposed in a small area or volume shorter than a wavelength of electromagnetic waves. The metamaterial is a microscopic optical element, that is, a material formed with a periodic array of meta atoms designed with a dielectric material including an assembly of composite elements formed from a general material, such as a metal or a plastic formed in a smaller size than the light wavelength to realize properties not naturally occurring. The metamaterial basically has a negative refractive index and may render an object invisible by refracting the light if the light reaches. The metamaterial may be designed to interact with the light and the sound wave in a way not observed in natural materials and may be applied to new applications, such as a high performance lens, an efficient small antenna, a supersensitive sensor. The metamaterial may tailor general wave propagation, such as electromagnetic waves or sound waves as well as the light and thus develop a stealth function. Using the metamaterial, the electronic device may adjust a propagation direction to an intended direction, and absorb or scatter the electromagnetic waves unlike general materials naturally occurring. If such a metamaterial is used, a high efficiency antenna may be manufactured by lowering attenuation by a higher antenna gain and a side lobe.

If such a metamaterial is used, the feeding line 441 of the second PCB 440 may form an electromagnetic bandgap (EBG) structure, and block signals from flowing in a specific direction within an EBG frequency through the EBG structure. Since the impedance may increase, this function may serve as an impedance transformer and transform the impedance. In this case, there is no need to excessively increase the length for the impedance matching, no loss occurs due to the excessive length increase of the feeding line 441, and thus the path loss may be mitigated.

In the structures shown in FIG. 4B, the connection relations between the components may be exemplary. For example, it is noted that other structure than the structure (e.g., the connection type of the RU board and the package board, the connection type of the RFIC, a vertical plated through hole (PTH) in the RU board) shown in FIG. 4B may be used as an embodiment of the disclosure.

Figure 5:
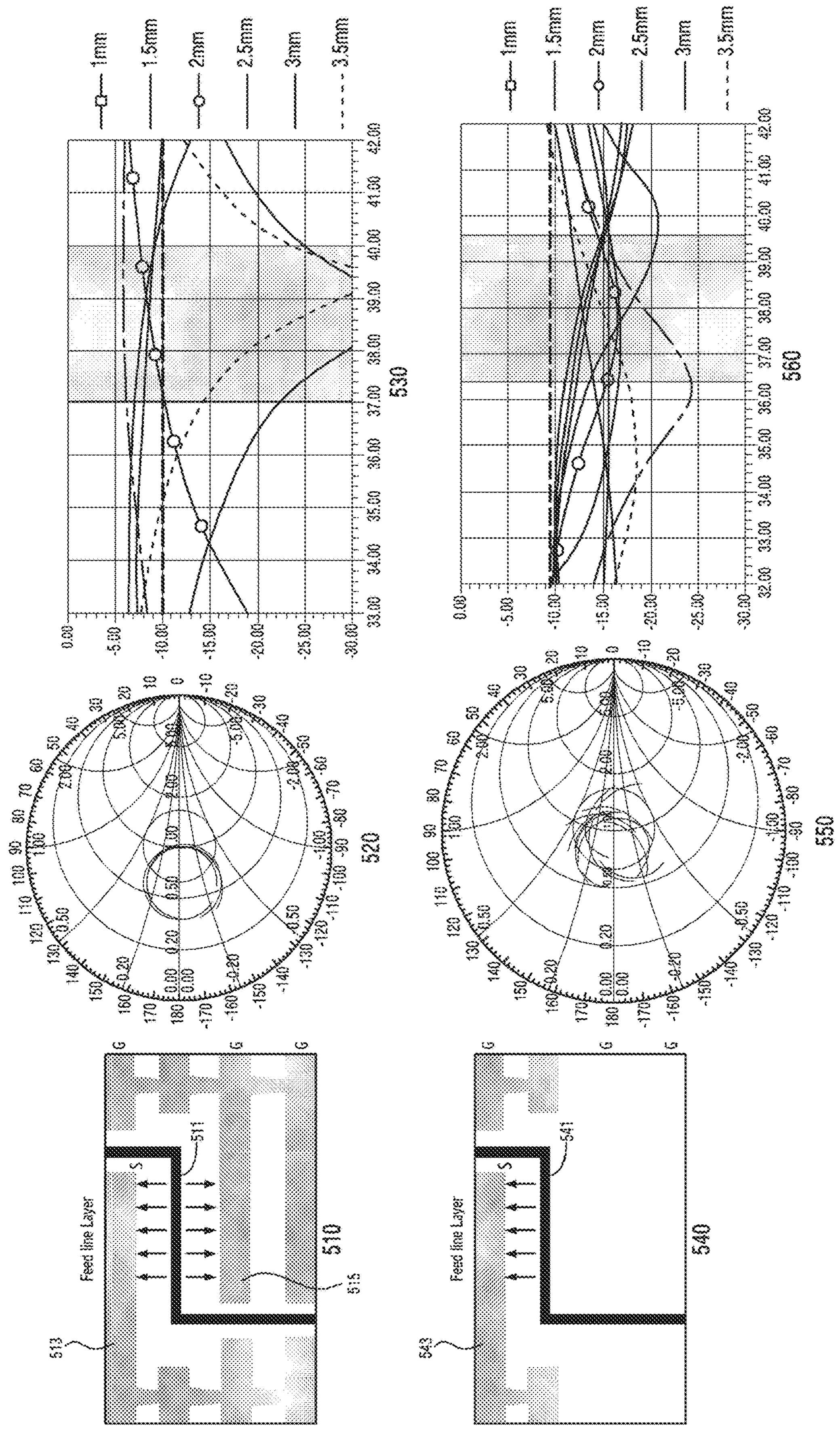
FIG. 5 illustrates structures of a stripline transmission line and a microstrip transmission line and their signal reflection and transmission degrees according to an embodiment of the disclosure.

FIG. 5 illustrates structures of a stripline transmission line and a microstrip transmission line and their signal reflection and transmission degrees according to an embodiment of the disclosure.

Referring to FIG. 5, an RU board 510 illustrates stripline transmission line. The RU board 510 of the stripline transmission line may include a structure corresponding to the RU 310 of FIG. 3B. In other words, the RU board 510 of the stripline transmission line of FIG. 5 may include the elements and the configurations included by the RU 310 of FIG. 3B, may not include some of them, or may further include other elements. In addition, the RU board 510 of the stripline transmission line may be the second PCB 440 of FIG. 4B. The RU board 510 of the stripline transmission line may include a feeding line 511. A first ground 513 may be disposed above the feeding line 511, and a second ground 515 may be disposed below the feeding line 511. The feeding line 511 included in the RU board 510 of the stripline transmission line may indicate a transmission line for forwarding an RF signal transferred from the RFIC 460 through the package board 450 to the first PCB 410. The feeing line 511 included in the RU board 510 of the stripline transmission line may have relatively low impedance due to the first ground 513 and the second ground 515, and the length of the feeding line 511 may excessively increase, for the impedance matching. Because the transmission moves up and down the first ground 513 and the second ground 515 in the feeding line 511, the impedance is relatively lowered. In this case, loss according to the excessive length increase of the feeding line 511 may occur. A Smith chart 520 of FIG. 5 illustrates performance influence according to an embodiment of the RU board 510 of the stripline transmission line. In the Smith chart 520, inside a dotted line circle may indicate low reflection, and outside the dotted line circle may indicate considerable reflection. In the RU board 510 of the stripline transmission line, lines outside the dotted line circle are 1 mm, 2 mm, 2.5 mm, and 3 mm, and lines inside the dotted line circle are 1.5 mm and 3.5 mm. This may be identified more closely in a graph 530. Referring to the graph 530 of FIG. 5, inside the dotted line circle, a reflection coefficient is below −10 dB and good transmission with low reflection may be identified, and outside the dotted line circle, the reflection coefficient is higher than −10 dB and accordingly good reflection may be identified. −10 dB may indicate 9 may pass, if 10 is applied. Thus, since the stripline transmission line is lower than −10 dB only in the length of 1.5 mm and 3.5 mm, the transmission is good only in these lengths and the transmission line of these lengths may be used.

A RU board 540 of the microstrip transmission line of FIG. 5 may include a structure corresponding to the RU 310 of FIG. 3B. In other words, the RU board 540 of the microstrip transmission line of FIG. 5 may include the elements and the configurations included by the RU 310 of FIG. 3B, may not include some of them, or may further include other elements. The RU board 540 of the microstrip transmission line may include a feeding line 541. A first ground 543 may be disposed above the feeding line 541, and a ground is not disposed below the feeding line 541. Since the feeding line 541 included in the RU board 540 of the microstrip transmission line, which includes only the first ground 543, may have relatively higher impedance than the stripline transmission line, the impedance matching may be achieved. In this case, even if a line of an unconstrained length is used, the impedance matching may be achieved, and accordingly there is no need to excessively increase the length, the loss according to the excessive length increase of the feeding line does not occur, and the path loss may be mitigated. This may be identified in a Smith chart 550, and a graph 560. The Smith chart 550 of FIG. 5 illustrates performance influence according to an embodiment of the RU board 540 of the microstrip transmission line. In the Smith chart 550, inside a dotted line circle may indicate low reflection, and outside the dotted line circle may indicate considerable reflection. In the RU board 540 of the microstrip transmission line, it is identified that all the lines are included in the circle. This may be identified more closely in a graph 560. Referring to the graph 560 of FIG. 5, inside the dotted line circle, the reflection coefficient is below −10 dB and good transmission with low reflection may be identified, and outside the dotted line circle, the reflection coefficient is higher than −10 dB and good reflection may be identified. −10 dB may indicate that 9 may pass, if 10 is applied. Thus, it may indicate that the microstrip transmission line may use the transmission line of any length unlike the stripline transmission line.

The microstrip transmission line does not use only a specific length like the stripline transmission line. Hence, there is no need to excessively increase the length for the impedance matching, no loss due to the excessive length increase of the feeding line occurs, and accordingly the path loss may be mitigated. However, since the PCB is actually the stacked structure, it is difficult to remove the lower ground. If it is removed, the PCB needs to be thickened, it may be bent in terms of durability, and accordingly it is hard to use the microstrip transmission line. However, using the metamaterial, the same effect as using the microstrip transmission line may be acquired. Hence, the same effect as using the microstrip transmission line by use of the metamaterial is described in FIGS. 6 through 12.

Figure 6:
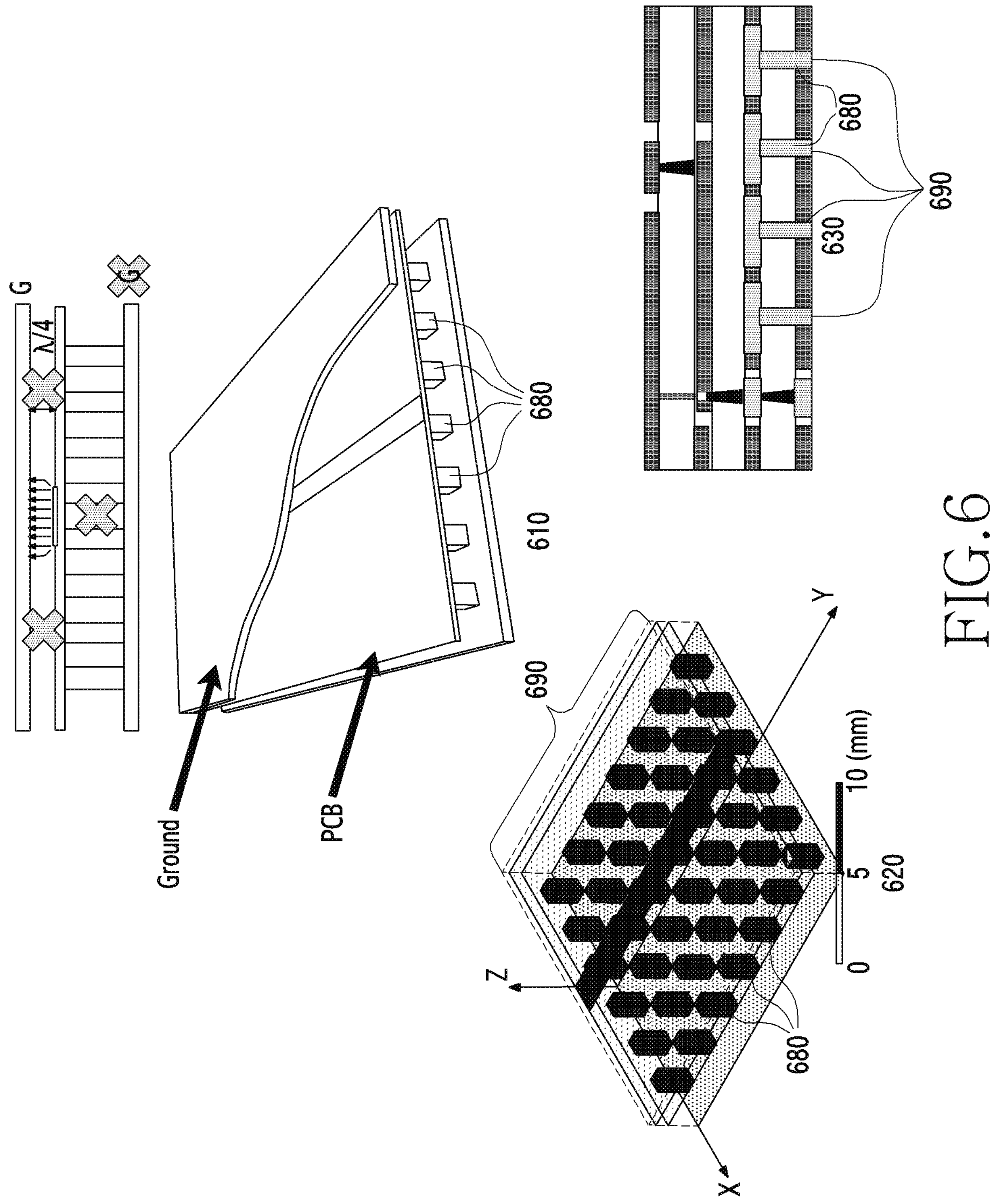
FIG. 6 illustrates a metamaterial structure and an arrangement of the metamaterial on a stripline transmission line according to an embodiment of the disclosure.

FIG. 6 illustrates a metamaterial structure and an arrangement of the metamaterial on a stripline transmission line according to an embodiment of the disclosure.

Referring to FIG. 6, an isometric drawing 610 illustrates deployment relations of a PCB, a ground, and a metamaterial 680. Referring to the isometric drawing 610, the metamaterial 680 is disposed between the PCB and the GROUND, to thus block a feeding line from moving up and down. Referring to an isometric drawing 620, repetitive arrangement of a specific structure may be identified. The metamaterial 680 may be represented in repetitive patterns of a specific structure as shown in the drawing, and in this case, may have an artificial property of other material. The property is determined by the type of the repetitive structure. Referring to an isometric drawing 630, the metamaterial 680 is disposed at a position of the second ground, with respect to the same structure as the stripline transmission line. Thus, signals transmitted in a downward direction are blocked as indicated by an arrow of the drawing 630. The structure which mounts the metamaterial at the second ground position may be functionally equivalent to an absence of the ground below the microstrip transmission line, as described above. If such a metamaterial is used, the EBG structure (690) may be formed, and the signal may be blocked from flowing in the specific direction within the EBG frequency in the EBG structure (690). This EBG structure (690) shall be described in FIG. 7.

Figure 7:
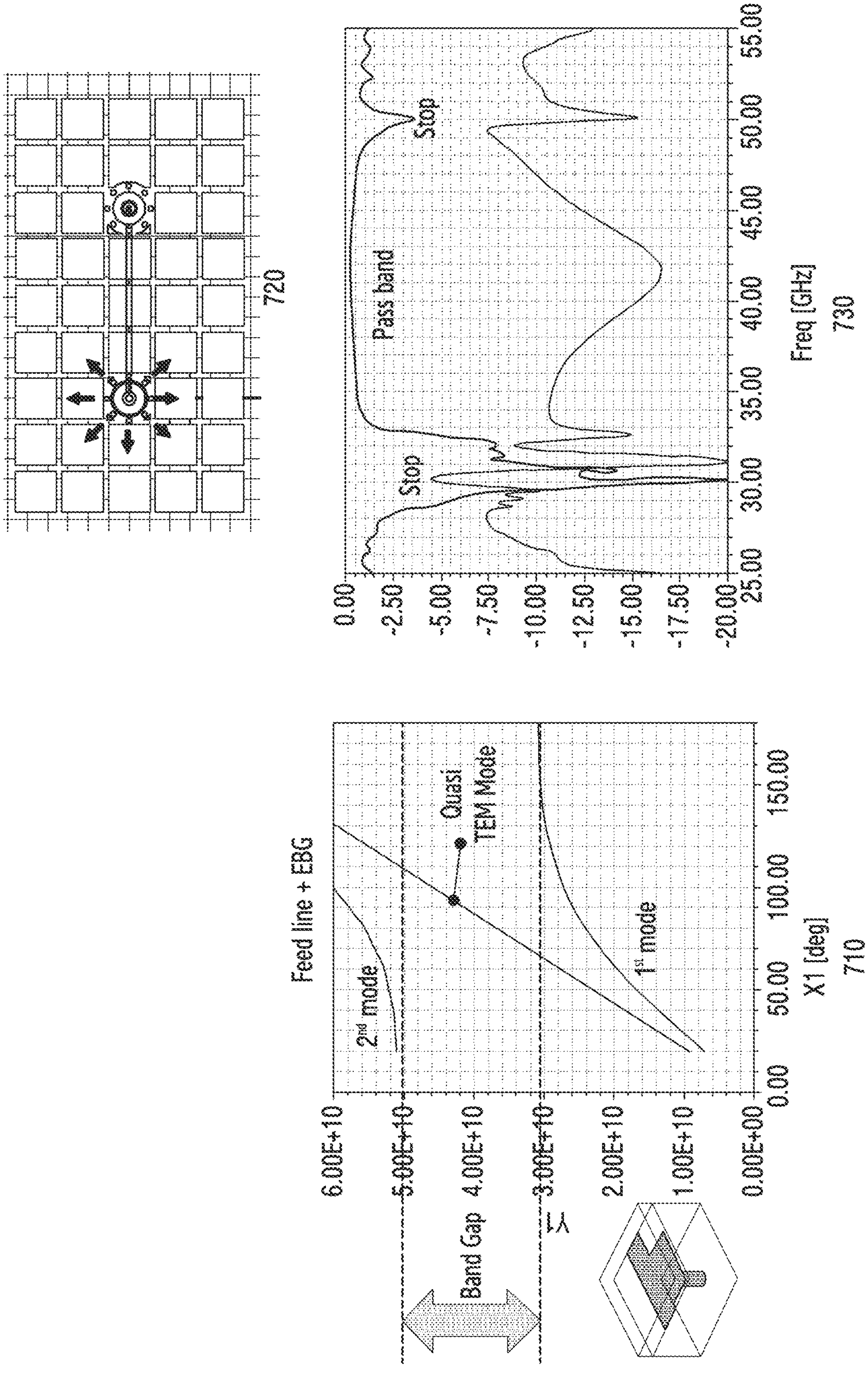
FIG. 7 illustrates limiting signal transmission to a specific direction if a metamaterial is utilized according to an embodiment of the disclosure.

FIG. 7 illustrates limiting signal transmission to a specific direction if a metamaterial is utilized according to an embodiment of the disclosure.

Referring to a graph 710 of FIG. 7, a first transmission mode (below 3 GHz frequency) and a second transmission mode (over 5 GHz frequency) may exist outside a band gap frequency. However, in 3 GHz and 5 GHz within the band gap frequency, no other transmission mode may exist, and only a quasi-transverse electromagnetic (TEM) transmission mode may exist. Referring to an isometric drawing 720, within the band gap frequency, the signal may be transmitted only to the right, and may be reflected in other directions not to pass. A graph 730 illustrates this with scattering parameters (S-parameters) of the frequency. Referring to the graph 730, a forward voltage gain (s21) abruptly drops and no transmission is identified, and an input port voltage reflection coefficient (s11) abruptly rises to achieve good reflection near 3 GHz. Likewise, the forward voltage gain (s21) abruptly drops and no transmission is identified, and the input port voltage reflection coefficient (s11) abruptly rises to achieve good reflection near 5 GHz. Accordingly, the signal only to the right may be transmitted, and may not pass in other directions, at 3 GHz and 5 GHz which are the band gap frequency.

Figure 8:
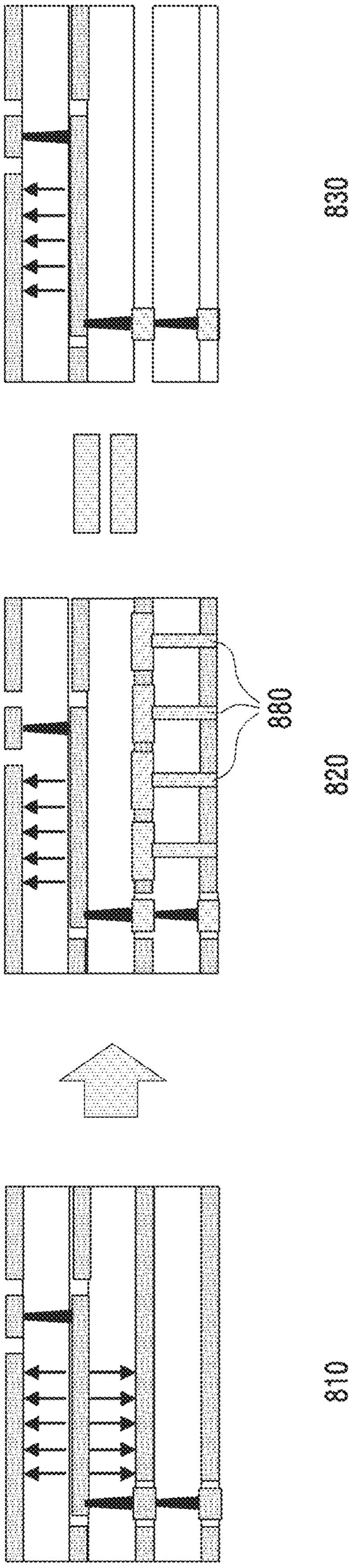
FIG. 8 illustrates a case where, if a metamaterial is utilized, even a stripline transmission line has properties of a microstrip transmission line, impedance may be relatively higher than a stripline transmission line of the related art, and thus impedance matching may be achieved according to an embodiment of the disclosure.

FIG. 8 illustrates a case where, if a metamaterial 880 is utilized, even a stripline transmission line has properties of a microstrip transmission line, impedance may be relatively higher than a stripline transmission line of the related art, and thus impedance matching may be achieved according to an embodiment of the disclosure.

Referring to FIG. 8, a cross-sectional view 810 is the stripline transmission line, signals are transmitted to the right while moving up and down a feeding line, the impedance reduces, and accordingly no good impedance is achieved. In a cross-sectional view 820, the metamaterial 880 is disposed only in the second ground in the stripline transmission line of the related art, signals are transmitted to the right while moving only upward in the feeding line, as in the microstrip of the cross-sectional view 830, and thus the impedance may increase. In this case, even if the line of an unconstrained length is used, the impedance matching may be identified. Thus, there is no need to excessively increase the length, no loss occurs due to the excessive length increase of the feeding line, and thus the path loss may be mitigated.

Figure 9:
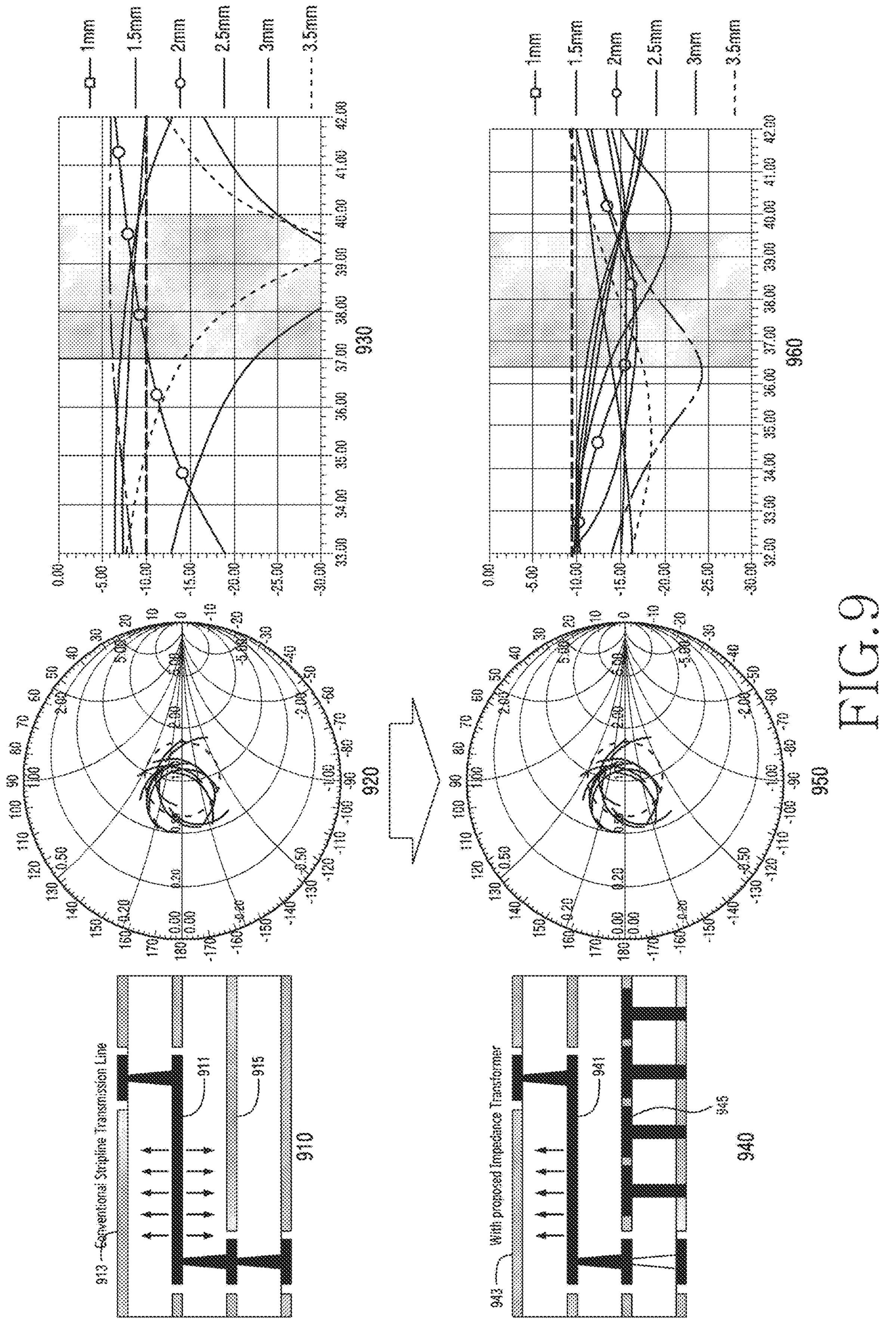
FIG. 9 illustrates a stripline transmission line and a stripline transmission line structure utilizing a metamaterial and its signal reflection and transmission degrees according to an embodiment of the disclosure.

FIG. 9 illustrates a stripline transmission line and a stripline transmission line structure utilizing a metamaterial and its signal reflection and transmission degrees according to an embodiment of the disclosure.

Referring to FIG. 9, an RU board 910 of the stripline transmission line may be configured in a structure corresponding to the RU 310 of FIG. 3B. In other words, the RU board 910 of the stripline transmission line of FIG. 9 may include the elements and the configurations included by the RU 310 of FIG. 3B, may not include some of them, or may further include other elements. In addition, the RU board 910 of the stripline transmission line may be the second PCB 440 of FIG. 4B. The RU board 910 of the stripline transmission line may include a feeding line 911. A first ground 913 may be disposed above the feeding line 911, and a second ground 915 may be disposed below the feeding line 911. The feeding line 911 included in the RU board 910 of the stripline transmission line may indicate a transmission line for forwarding an RF signal transferred from the RFIC 460 through the package board 450 to the first PCB 410. The feeing line 911 included in the RU board 910 of the stripline transmission line may have relatively low impedance due to the first ground 913 and the second ground 915, and the length of the feeding line 911 may excessively increase, for the impedance matching. Because the transmission moves up and down the first ground 913 and the second ground 915 in the feeding line 911, the impedance is relatively lowered. In this case, loss according to the excessive length increase of the feeding line 911 may occur. A Smith chart 920 of FIG. 9 illustrates performance influence according to an embodiment of the RU board 910 of the stripline transmission line. In the Smith chart 920, inside a dotted line circle may indicate low reflection, and outside the dotted line circle may indicate considerable reflection. In the RU board 910 of the stripline transmission line, lines outside the dotted line circle are 1 mm, 2 mm, 2.5 mm, and 3 mm, and lines inside the dotted line circle are 1.5 mm and 3.5 mm. This may be identified more closely in a graph 930. Referring to the graph 930 of FIG. 9, inside the dotted line circle, the reflection coefficient is below −10 dB and good transmission with low reflection may be identified, and outside the dotted line circle, the reflection coefficient is higher than −10 dB and good reflection may be identified. −10 dB may indicate 9 may pass, if 10 is applied. Thus, since the stripline transmission line is lower than −10 dB only in the length of 1.5 mm and 3.5 mm, the transmission is good only in these lengths and the transmission line of these lengths may be used.

The RU board 940 of the stripline transmission line utilizing the metamaterial of FIG. 9 may include a feeding line 941. A first ground 943 may be disposed above the feeding line 941, and a metamaterial 945 instead of a second ground may be disposed below the feeding line 941. Since signals, if transmitted in the feeding line 941, are transmitted by moving only upward without moving downward, by the EBG structure of the metamaterial, the feeding line 941 included in the RU board 940 of the stripline transmission line utilizing the metamaterial of FIG. 9 may have an effect as if only the first ground 943 exists like the microstrip transmission line. In this case, the impedance may be relatively higher than the stripline transmission line, thus achieving the impedance matching. In this case, even if the line of an unconstrained length is used, the impedance matching may be achieved, and accordingly there is no need to excessively increase the length, the loss according to the excessive length increase of the feeding line does not occur, and the path loss may be mitigated. This may be identified in a Smith chart 950, and a graph 960. The Smith chart 950 of FIG. 9 illustrates performance influence according to an embodiment of the RU board 940 of the stripline transmission line utilizing the metamaterial. In the Smith chart 950, inside a dotted line circle may indicate low reflection, and outside the dotted line circle may indicate considerable reflection. In the RU board 940 of the stripline transmission line utilizing the metamaterial, it is identified that all the lines are included in the circle. This may be identified more closely in the graph 560. Referring to the graph 960 of FIG. 9, inside the dotted line circle, the reflection coefficient is below −10 dB and accordingly good transmission with low reflection may be identified, and outside the dotted line circle, the reflection coefficient is higher than −10 dB and accordingly good reflection may be identified. −10 dB may indicate that 9 may pass, if 10 is applied. Thus, it may be identified that since every line is lower than −10 dB, the RU board 940 of the stripline transmission line utilizing the metamaterial may use the transmission line of any length unlike the stripline transmission line.

The stripline transmission line utilizing the metamaterial of FIG. 9 does not use only a specific length like the stripline transmission line. Accordingly, there is no need to excessively increase the length for the impedance matching, no loss due to the excessive length increase of the feeding line occurs, and thus the path loss may be mitigated. In addition, since the PCB is actually the stacked structure, the problem that it is difficult to remove the lower ground may be addressed by utilizing the metamaterial.

Figure 10:
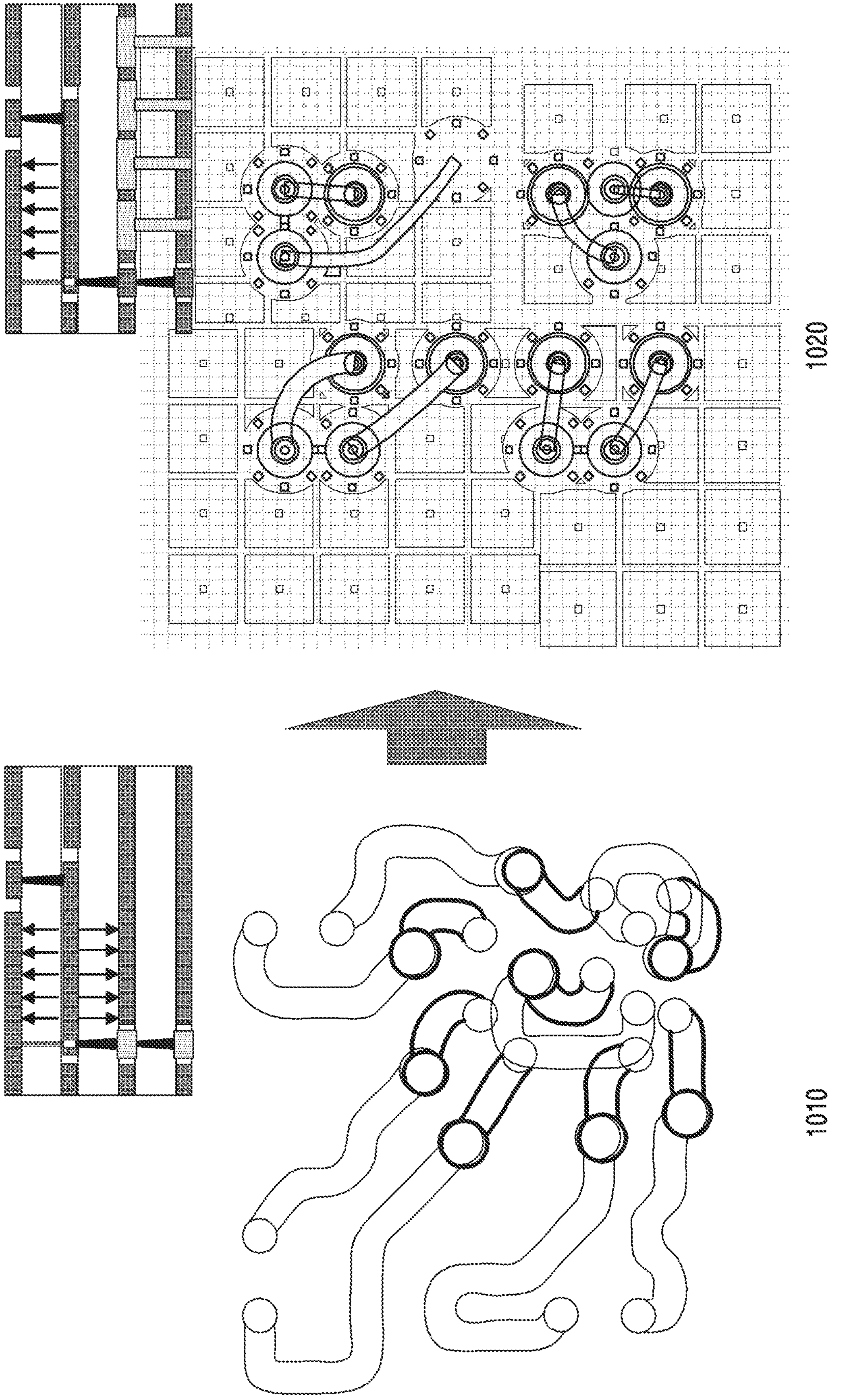
FIG. 10 illustrates drawings of comparing a feedline length of a stripline transmission line and a feedline length of a stripline transmission line utilizing a metamaterial according to an embodiment of the disclosure.

FIG. 10 illustrates drawings of comparing a feeding line length of a stripline transmission line and a feeding line length of a stripline transmission line utilizing a metamaterial according to an embodiment of the disclosure.

Referring to FIG. 10, an isometric drawing and a cross-sectional view 1010 illustrate the stripline transmission line, wherein the length of the used feeding line is depicted. The stripline transmission line, which may have low impedance, may use a specific feeding line length, for the impedance matching. Hence, for the impedance matching, the feeding line length may excessively increase. In this case, loss may occur due to the excessive increase of the feeding line length. To address this problem, an isometric drawing and a cross-sectional view 1020 use the stripline transmission line utilizing the metamaterial, and represent how the feeding line length is shortened, if the stripline transmission line utilizing the metamaterial is used. If the stripline transmission line utilizing the metamaterial is used, and signals are transferred in the feeding line 941 as shown, the signals are delivered while moving only upward without moving downward, and accordingly the effect as if the first ground alone exists like the microstrip transmission line may be achieved. In this case, the impedance may be relatively higher than the stripline transmission line, thus achieving the impedance matching. In this case, even if the line of an unconstrained length is used, the impedance matching may be attained, and accordingly there is no need to excessively increase the length, the loss according to the excessive length increase of the feeding line does not occur, and the path loss may be mitigated. Hence, as shown in the isometric drawing and the cross-sectional view 1020, the impedance matching is achieved, the signals may be transferred even using the feeding line of the short length without reflections.

Figure 11:
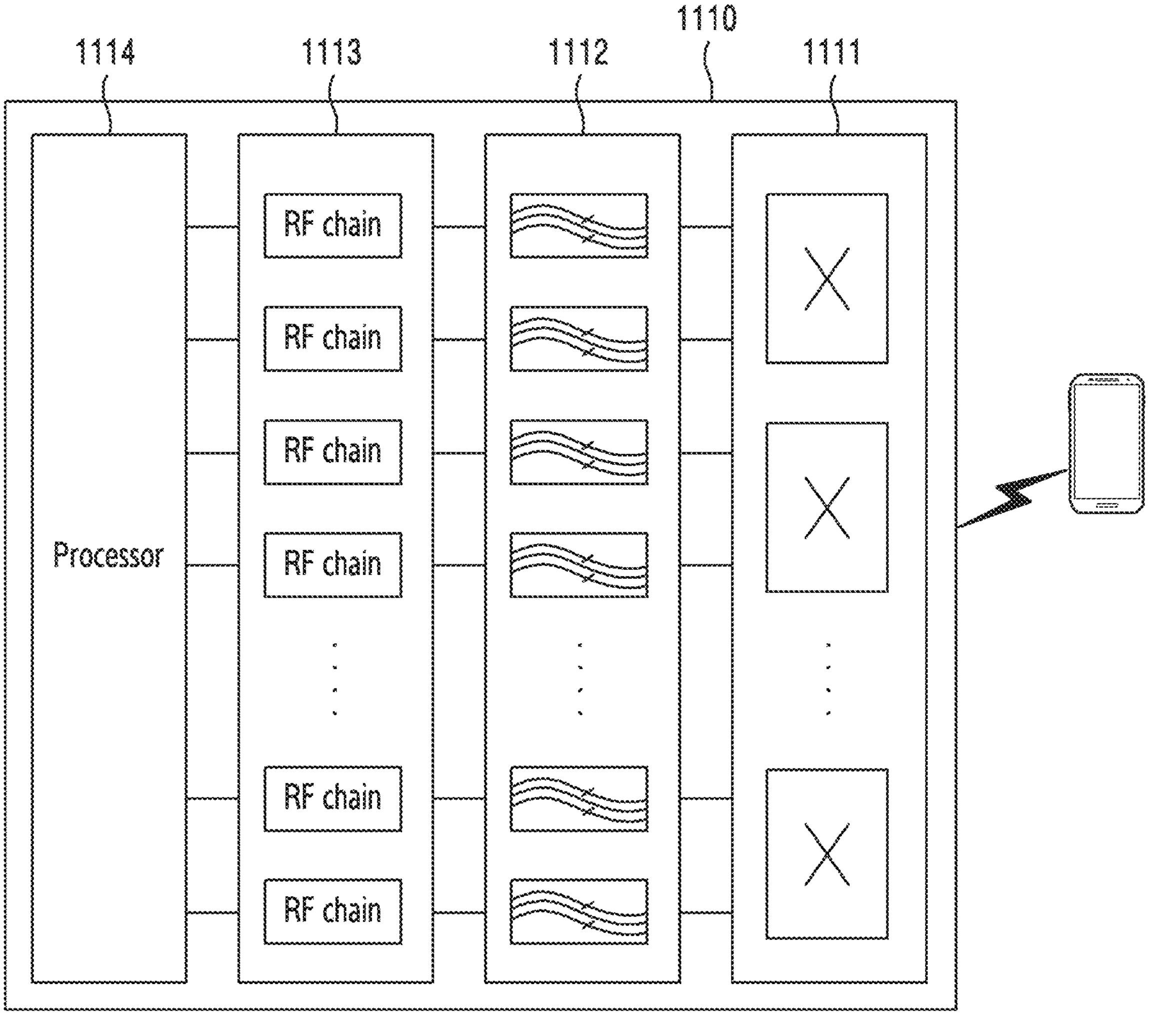
FIG. 11 illustrates a functional configuration of an electronic device having an air based feed structure an embodiment of the disclosure.

FIG. 11 illustrates a functional configuration of an electronic device 1110 having an air based feed structure according to an embodiment of the disclosure.

Referring to FIG. 11, the air based feed structure indicates a structure in which a feeding line is formed in an air layer formed between a board (i.e., an antenna board) for mounting an antenna for radiation and a board (i.e., an RU board or a main board) for mounting RF components (e.g., an RF signal line, a power amplifier, a filter). If the antenna board is mounted on the main board, the feeding line may be formed in at least one of the lowest layer of the antenna board or the highest layer of the main board. An electronic device 1110 may be one of the base station 110 or the terminal 120 of FIG. 1. According to an embodiment of the disclosure, the electronic device 1110 may be base station equipment supporting the mmWave communication (e.g., Frequency Range 2 of 3GPP). The antenna structure itself mentioned in FIGS. 1, 2A, 2B, 3A, 3B, 4A, 4B, and 5 to 10, and the electronic device including the same are included in the various embodiments of the disclosure. The electronic device 1110 may include RF equipment having the air based feed structure.

Referring to FIG. 11, the functional configuration of the electronic device 1110 is shown. The electronic device 1110 may include an antenna unit 1111, a power interface unit 1112, an RF processing unit 1113, and a control unit 1114.

The antenna unit 1111 may include a plurality of antennas. The antenna performs functions for transmitting and receiving signals over a radio channel. The antenna may include a conductor formed a substrate (e.g., a PCB) or a radiator formed in a conductive pattern. The antenna may radiate an up-converted signal or obtain a signal radiated by other device over the radio channel. Each antenna may be referred to as an antenna element or an antenna device. In some embodiments of the disclosure, the antenna unit 1111 may include an antenna array in which a plurality of antenna elements is arrayed. The antenna unit 1111 may be electrically connected with the power interface unit 1112 through RF signal lines. The antenna unit 1111 may be mounted on the PCB including the plurality of the antenna elements. According to an embodiment of the disclosure, the antenna unit 1111 may be mounted on an FPCB. The antenna unit 1111 may provide the received signal to the power interface unit 1112 or radiate a signal provided from the power interface unit 1112 over the air.

The power interface unit 1112 may include modules and parts. The power interface unit 1112 may include one or more IFs. The power interface unit 1112 may include one or more LOs. The power interface unit 1112 may include one or more LDOs. The power interface unit 1112 may include one or more DC/DC converters. The power interface unit 1112 may include one or more DFEs. The power interface unit 1112 may include one or more FPGAs. The power interface unit 1112 may include one or more connectors. The power interface unit 1112 may include a power supply.

According to an embodiment of the disclosure, the power interface unit 1112 may include areas for mounting one or more antenna modules. For example, the power interface unit 1112 may include a plurality of antenna modules, to support multiple input multiple output (MIMO) communication. The antenna modules according to the antenna unit 1111 may be mounted in corresponding areas. According to an embodiment of the disclosure, the power interface unit 1112 may include a filter. The filter may perform filtering, to forward the signal of an intended frequency. The power interface unit 1112 may include the filter. The filter may perform a function for selectively identifying the frequency by generating resonance. The power interface unit 1112 may include at least one of a band pass filter, a low pass filter, a high pass filter, or a band reject filter. For example, the power interface unit 1112 may include RF circuits for acquiring the signal of the frequency band for transmission or the frequency band for reception. The power interface unit 1112 according to various embodiments may electrically connect the antenna unit 1111 and the RF processing unit 1113.

The RF processing unit 1113 may include a plurality of RF processing chains. The RF chain may include a plurality of RF elements. The RF elements may include an amplifier, a mixer, an oscillator, a DAC, an ADC, or the like. According to an embodiment of the disclosure, the RF processing chain may indicate an RFIC. For example, the RF processing unit 1113 may include an up converter which upconverts a digital transmit signal of a base band into a transmission frequency, and a DAC which converts the up-converted digital transmit signal into an analog RF transmit signal. The up converter and the DAC form a part of the transmission path. The transmission path may further include a power amplifier (PA) or a coupler (or a combiner). In addition, for example, the RF processing unit 1113 may include an ADC which converts an analog RF receive signal into a digital receive signal, and a down converter which converts a digital receive signal into a digital receive signal of the base band. The ADC and the down converter form a part of the reception path. The reception path may further include a low-noise amplifier (LNA) or a coupler (or a divider). The RF parts of the RF processing unit may be implemented on a PCB. The electronic device 1110 may include a structure in which the antenna unit 1111-the power interface unit 1112-the RF processing unit 1113 are stacked in order. The antennas, the RF parts of the power interface unit, and the RFICs may be implemented on a separate PCB, and filters may be repeatedly coupled between the PCB and the PCB to thus form a plurality of layers.

The control unit 1114 may control general operations of the electronic device 1110. The control unit 1114 may include various modules for performing the communication. The control unit 1114 may include at least one processor, such as a modem. The control unit 1114 may include modules for digital signal processing. For example, the control unit 1114 may include a modem. In data transmission, the control unit 1114 generates complex symbols by encoding and modulating a transmit bit string. In addition, for example, in data reception, the control unit 1114 may restore a receive bit string by demodulating and decoding a base band signal. The control unit 1114 may perform functions of a protocol stack required by a communication standard.

FIG. 11 illustrates the functional configuration of the electronic device 1110, as the equipment for utilizing the antenna structure of the disclosure. However, the example illustrated in FIG. 11 is simply the configuration for utilizing the RF filter structure according to various embodiments of the disclosure described in FIGS. 1, 2A, 2B, 3A, 3B, 4A, 4B, and 5 to 10, and the various embodiments of the disclosure are not limited to the components of the equipment shown in FIG. 11. Hence, an antenna module including the antenna structure, communication equipment of another configuration, and an antenna structure may be understood as an embodiment of the disclosure.

According to various embodiments of the disclosure, it may include a first PCB corresponding to the plurality of the antenna arrays; and a second PCB including a power interface, the second PCB may include a feeding line for delivering signals to the antenna elements, a first layer formed away from a first surface of the feeding line, and a second layer formed away from a second surface of the feeding line, and the second layer may include a metamaterial for transforming impedance.

According to an embodiment of the disclosure, the second PCB may be the RU module, having a stripline structure.

According to an embodiment of the disclosure, the second PCB may be the RU module, for reducing a length of the feeding line due to the metamaterial.

According to an embodiment of the disclosure, the second PCB may be the RU module, having the same properties as a microstrip line due to the metamaterial.

According to an embodiment of the disclosure, the metamaterial may be the RU module, forming an EBG.

According to an embodiment of the disclosure, the signals may be the RU module, delivered by the metamaterial in the first layer direction and a direction parallel to the feeding line.

According to an embodiment of the disclosure, the first layer may be the RU module, which is a ground.

According to an embodiment of the disclosure, the metamaterial may be the RU module, having a structure in which a specific structure is repeatedly arranged.

According to an embodiment of the disclosure, the RU module may determine a length of the feeding line depending on the impedance.

According to an embodiment of the disclosure, the RU module may transfer only signals of a specific frequency due to the EBG.

According to various embodiments of the disclosure, an electronic device may include a plurality of antenna arrays; a plurality of first PCB sets corresponding to the plurality of the antenna arrays; and a second PCB including a power interface, the second PCB may include a feeding line for delivering signals to the antenna elements, a first layer formed away from a first surface of the feeding line, and a second layer formed away from a second surface of the feeding line, and the second layer may include a metamaterial for transforming impedance.

According to an embodiment of the disclosure, the second PCB may be the electronic device, having a stripline structure.

According to an embodiment of the disclosure, the second PCB may be the electronic device, for reducing a length of the feeding line due to the metamaterial.

According to an embodiment of the disclosure, the second PCB may be the electronic device, having the same properties as a microstrip line due to the metamaterial.

According to an embodiment of the disclosure, the metamaterial may be the electronic device, forming an EBG.

According to an embodiment of the disclosure, the signals may be the electronic device, delivered by the metamaterial in the first layer direction and a direction parallel to the feeding line.

According to an embodiment of the disclosure, the first layer may be the electronic device, which is a ground.

According to an embodiment of the disclosure, the metamaterial may be the electronic device, having a structure in which a specific structure is repeatedly arranged.

According to an embodiment of the disclosure, the electronic device may determine a length of the feeding line depending on the impedance.

According to an embodiment of the disclosure, the electronic device may transfer only signals of a specific frequency due to the EBG.

The methods according to the various embodiments described in the claims or the specification of the disclosure may be implemented in software, hardware, or a combination of hardware and software.

As for the software, at least one non-transitory computer-readable storage medium storing one or more programs (software modules) may be provided. One or more programs stored in the at least one non-transitory computer-readable storage medium may be configured for execution by one or more processors of an electronic device. One or more programs may include instructions for controlling the electronic device to execute the methods according to the various embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

In addition, the program may be stored in an attachable storage device accessible via a communication network, such as Internet, Intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been shown and described in with reference to various embodiments thereof, it will be understood by those skilled in the art that various changes in form and details may be made therein without departing from the spirit and scope of the disclosure as defined by the appended claims and their equivalents.

What is claimed is:

1. A radio unit (RU) module comprising:

an antenna array including a plurality of antenna elements;

a first printed circuit board (PCB) for the plurality of the antenna elements;

a second PCB including a first surface and a second surface;

a connection portion disposed on the first surface for connecting the first PCB and the second PCB; and a radio frequency integrated circuit (RFIC) disposed on the second surface of the second PCB, wherein the second PCB comprises:

a first layer including a ground, a second layer including a portion in which a structure for an electromagnetic bandgap (EBG) is repetitively formed, a third layer disposed between the first layer and the second layer and including a feeding line for delivering signals to the plurality of the antenna elements, and a conductive via penetrating the second layer for electrically connecting the feeding line of the third layer and the RFIC, and wherein an impedance of the feeding line is transformed via the structure.

2. The RU module of claim 1, wherein the feeding line corresponds to a stripline structure.

3. The RU module of claim 1, wherein the structure for the EBG is configured to transform the impedance of the feeding line such that a length of the feeding line is reduced.

4. The RU module of claim 1, wherein the structure for the EBG is configured to transform the impedance of the feeding line such that the feeding line has the same properties as a microstrip line.

5. The RU module of claim 1, wherein the structure includes a metamaterial for transforming the impedance.

6. The RU module of claim 1, wherein the structure for the EBG includes a metamaterial having an artificial property of another material, and wherein the artificial property is determined based on a type of the structure.

7. The RU module of claim 1, wherein a length of the feeding line is determined based on the impedance of the feeding line.

8. An electronic device comprising:

an antenna array including a plurality of antenna elements;

a plurality of first printed circuit boards (PCBs) including a first PCB for the antenna array;

a second PCB including a first surface and a second surface;

a connection portion disposed on the first surface for connecting the first PCB and the second PCB; and a radio frequency integrated circuit (RFIC) disposed on the second surface of the second PCB, wherein the second PCB comprises:

a first layer including a ground, a second layer including a portion in which a structure for an electromagnetic bandgap (EBG) is repetitively formed, a third layer disposed between the first layer and the second layer and including a feeding line for delivering signals to the antenna array, and a conductive via penetrating the second layer for electrically connecting the feeding line of the third layer and the RFIC, and wherein an impedance of the feeding line is transformed via the structure.

9. The electronic device of claim 8, wherein the feeding line corresponds to a stripline structure.

10. The electronic device of claim 8, wherein the structure for the EBG is configured to transform the impedance of the feeding line such that a length of the feeding line is reduced.

11. The electronic device of claim 8, wherein the structure for the EBG is configured to transform the impedance of the feeding line such that the feeding line has the same properties as a microstrip line.

12. The electronic device of claim 8, wherein the structure includes a metamaterial for transforming the impedance.

13. The electronic device of claim 8, wherein the structure for the EBG includes a metamaterial having an artificial property of another material, and wherein the artificial property is determined based on a type of the structure.

14. The electronic device of claim 8, wherein a length of the feeding line is determined based on the impedance of the feeding line.

15. The RU module of claim 1, further comprising:

a frame disposed on the first PCB; and a first portion on which the antenna array is disposed, wherein the frame supports the first portion.

16. The RU module of claim 15, wherein an air layer is disposed between the first PCB and the first portion.

17. The RU module of claim 1, wherein the structure for the EBG is configured to transform the impedance of the feeding line such that a signal of a specific frequency band is transferred via the feeding line.

18. The electronic device of claim 8, further comprising:

a frame disposed on the first PCB; and a first portion on which the antenna array is disposed, wherein the frame supports the first portion.

19. The electronic device of claim 18, wherein an air layer is disposed between the first PCB and the first portion.

20. The electronic device of claim 8, wherein the structure for the EBG is configured to transform the impedance of the feeding line such that a signal of a specific frequency band is transferred via the feeding line.

* * * * *